G. W. CRANK.
ESCAPEMENT WHEEL.
APPLICATION FILED DEC. 22, 1909.
991,048.
Patented May 2, 1911.
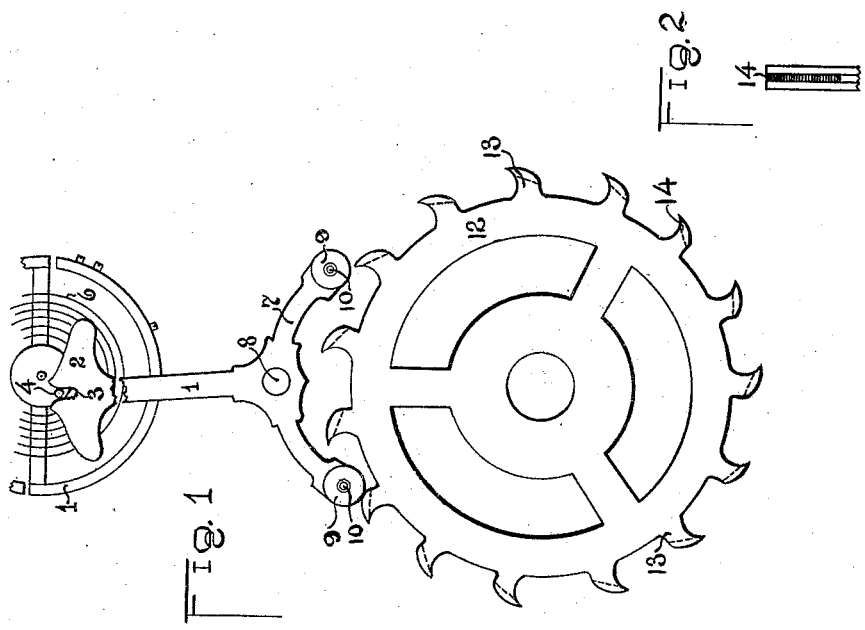

UNITED STATES PATENT OFFICE.

GEORGE W. CRANK, OF MADRID, IOWA.

ESCAPEMENT-WHEEL.

991,048. Specification of Letters Patent. Patented May 2, 1911.

Application filed December 22, 1909. Serial No. 534,516.

*To all whom it may concern:*

Be it known that I, GEORGE W. CRANK, a citizen of the United States, residing at Madrid, in the county of Boone and State of Iowa, have invented certain new and useful Improvements in Escapement-Wheels; and I do hereby declare the following to be a full, clear, and exact description of the invention, such as will enable others skilled in the art to which it appertains to make and use the same.

This invention relates to improvements in escapement wheels and the leading object thereof is to provide an escapement wheel having teeth in which hardened strips of metal are inserted in an improved manner.

These and other objects will be hereinafter referred to and more particularly pointed out in the specification and the claim.

In the drawings forming a part of this application, Figure 1 is a plan view showing a pallet used with watch and clock movements and having roller pallet bearings coöperating with an escapement wheel, a fragment of a balance wheel and hair spring also being shown. Fig. 2 is a detail fragmentary view showing a metallic insertion in the teeth of the pallet wheel.

In Fig. 1 is shown a pallet 1 having at one end a substantially elliptical extension 2 and in the longitudinal center of said extension is a lever fork 3, said lever fork adapted to engage a balance roller 4 carried by a balance wheel 5, said balance wheel having a hair spring 6. The end of the pallet opposite to the extension 2 terminates in an arcuate pallet arm 7 and the pallet is fulcrumed at a point 8, while a terminating portion of said pallet arm has lever pallets 9 pivotally mounted upon pins 10. The pallets 9 carried by the arm 7 are designed to coöperate with an escapement wheel 12, said member 12 having a plurality of beveled teeth 13 in its periphery, the latter contacting with the outer circumference of the pallets 9 at a point adjacent the lower part of the bevel of said teeth. A suitable strip of metal 14 is inserted in relatively narrow grooves of each tooth so as to extend longitudinally within the central portion of each of the teeth 13, said strip of metal being composed of a substance harder than that of which the teeth are composed, the object being to reduce the ordinary wear to which the teeth are subjected. The thin hardened strips are so arranged in the teeth that the outer or contacting surfaces of said strips are flush with the outer surfaces of the teeth, whereby the teeth and strips will wear evenly.

It will be seen that a line of diameter drawn through the first and third quadrants of the circular rollers 9 will form a point of contact with the lower portion of the beveled edge of the teeth 13, as said teeth rotate in contact with said roller members. The advantages of having the roller members and teeth contact in such a manner are that the lifting faces of the teeth encounter a minimum amount of friction, thus increasing the lifting power and further that a different point of contact occurs each time, since the rollers are pivotally mounted, thus reducing the wear on the same. The same points are true of the structure, as disclosed in Fig. 2. The substantially V-shaped teeth 18 being bevel and contacting with the pivotally mounted rollers 16, as shown, the lifting power of the wheel 19 is increased, since the friction encountered is small and consequently the wear of the contacting members is reduced.

What I claim is:—

An escapement wheel having a plurality of peripheral teeth, each tooth being formed with a curved edge and with a relatively narrow slot in said edge and extending longitudinally thereof, and a relatively narrow strip of metal harder than the metal of the teeth disposed in the slot of each tooth with the other surface of said strip flush with the contacting surface of the tooth.

In testimony whereof I have signed my name to this specification in the presence of two subscribing witnesses.

GEORGE W. CRANK.

Witnesses:
 G. C. CARLSON,
 BLANCHE FRISE.

Copies of this patent may be obtained for five cents each, by addressing the "Commissioner of Patents, Washington, D. C."